Oct. 21, 1924. 1,512,042

J. H. REED

METHOD OF SHOEMAKING

Original Filed Feb. 2, 1923

INVENTOR:
James H. Reed,
by Macleod, Calver, Copeland & Dike.
Attys.

JAMES H. REED, OF SWAMPSCOTT, MASSACHUSETTS, ASSIGNOR, BY MESNE ASSIGNMENTS, TO THE LITTLEWAY PROCESS COMPANY, OF LYNN, MASSACHUSETTS, A CORPORATION OF MASSACHUSETTS.

METHOD OF SHOEMAKING.

Original application filed February 2, 1923, Serial No. 616,623. Divided and this application filed October 19, 1923. Serial No. 669,583.

*To all whom it may concern:*

Be it known that I, JAMES H. REED, a citizen of the United States, residing at Swampscott, county of Essex, State of Massachusetts, have invented a certain new and useful Improvement in Methods of Shoemaking, of which the following is a specification, reference being had therein to the accompanying drawings.

The present invention relates to a new and simplified method of shoemaking and produces a shoe which is an improved form of the shoe shown in my prior application Serial No. 616,623, filed February 2, 1923.

At the present time, shoes are chiefly of three types, i. e., Goodyear welt shoes, turn shoes and McKay shoes. Each of these types of shoes requires for their production different machinery, equipment and manufacturing methods, and usually the different types of shoes are made in different factories or in separate departments of the same factory, but always with different machinery, since the same machinery is not as a whole adapted to make the three kinds of shoes.

Moreover, each of these several shoemaking methods is subject to certain limitations and disadvantages which are well recognized in the art, while the shoes produced thereby are also characterized by certain inherent limitations and defects which render each suitable for certain purposes and classes of trade only and not for others. The welt method is comparatively complicated and expensive and requires a great amount of heavy machinery and a large investment of capital, while the shoes produced thereby, although durable and substantial, are relatively heavy, so as to be unsuitable for certain dress and similar purposes, and particularly fail to meet the present requirements of women's wear. The turn method is also comparatively complicated and expensive and requires highly skilled labor, while the shoes produced, although soft, light and comfortable, soon lose their shape and cease to fit the foot properly. The McKay method is relatively cheap, but the shoes produced thereby are of low grade, are stiff, and uncomfortable, and are of short life.

The present invention has for an object to provide a method of shoemaking which combines the advantages while eliminating the disadvantages of the several methods now generally employed, which is substantially as inexpensive as the McKay method, and which produces shoes that are as flexible and comfortable and may be as light as turned shoes but are as durable and have the same shape-keeping qualities as welt shoes. Another object of the invention is to provide a method by which shoes which cannot be distinguished by the ordinary observer from welt shoes, others which cannot be distinguished from turned shoes, and still others which appear to be McKay shoes can all be made in the same factory or department and with the same equipment of machinery comprising only a few comparatively inexpensive machines and with a minimum amount of skilled labor. The shoes can be made in light or heavy weights as required and have many desirable qualities resulting from the peculiar novel method of manufacture.

In accordance with said method, the upper, with its lining, and an insole, which is flat and without the usual channels or lips, are assembled on a last, which may be unarmoured, the shoe lasted in any usual or well-known way, and the upper permanently secured to the face of the insole, preferably by fasteners which are firmly anchored within the substance of the insole without causing them to penetrate said insole completely, said fasteners being therefore incapable of working into the interior of the shoe and injuring the foot of the wearer. The upper may, prior to its permanent attachment to the insole, be held in place by temporary lasting tacks which, if used, are subsequently removed. The bottom of the shoe is then suitably prepared to receive an outsole, and said outsole, which may have been previously molded substantially to shape, secured temporarily in place, as by cement. The last is then removed, and the insole, outsole and upper permanently united by through-and-through stitching. Said stitching preferably comprises a lock stitch seam which welds the parts firmly and durably together without imparing the flexibility of the shoe.

The method will best be understood from the following detailed description of one mode of practising the same as illustrated in the accompanying drawings. It will be understood, however, that the scope of the invention, as defined by the claims hereunto appended, is not limited to the particular materials or steps which have been chosen for illustrative purposes in this description.

Figure 1:
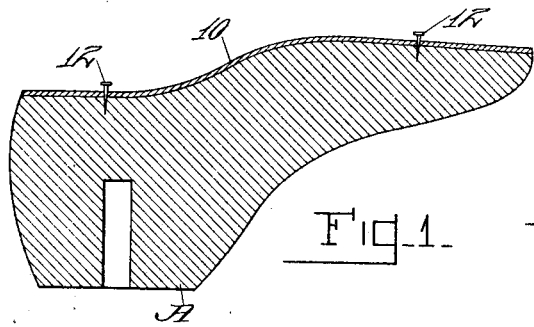
Fig. 1 is a vertical section of a last with the insole in place.
Figure 3:
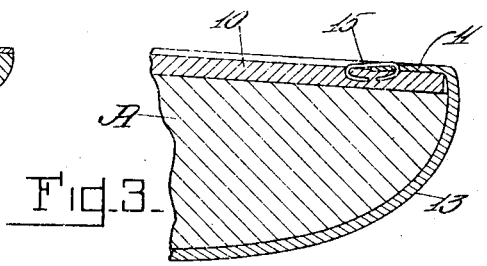
Fig. 3 is a vertical section after the tacks have been pulled out.
Figure 2:
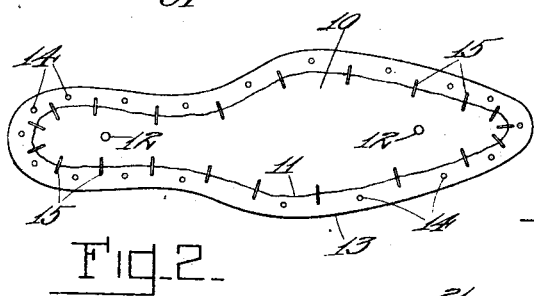
Fig. 2 is a bottom plan view after the shoe has been lasted and stapled.

Referring now to the drawings, an insole 10 is laid on the last A and secured in place by temporary tacks 12. Said insole is flat and intact, that is to say, is not split or channelled to form lips for the attachment of the upper or for the reception of clinching plates, thereby avoiding weakening the insole in this respect besides cheapening the process by eliminating the expense of such preparation as well as by effecting certain economies and improvements in subsequent operations. The last A is not armored except in special cases at the toe when it is desired to secure the upper to the insole by tacks before the shoe is stitched. The last employed can be the ordinary last for welt or turn shoes, no special last being required, which is a great saving, as it avoids duplicating equipment. The upper 13 is then put in place and lasted in any convenient manner, either by hand or machine. The inturned edges 11 of the upper are laid flat against the bottom of the insole and, simultaneously with the lasting, are tacked to the insole and last by temporary tacks 14. These tacks 14 are set about midway between the edge of the last and the inturned edge 11 of the upper, leaving the extreme inner edge free. Next, the edges of the upper are permanently secured to the bottom of the insole, by fastening means which do not penetrate the insole. In the preferred embodiment of the invention, (see Figs. 2 and 3), I employ staples 15 which are clinched within the substance of the insole and do not penetrate to the inside, as described in my prior application filed February 2, 1923, Serial No. 616,622. Preferably, these staples are placed at right angles to and overlie the edge of the upper so that when the tacks 14 are removed the space between the outer end of the staples 15 and the edge of the last is free and unobstructed for the reception of the stitching. These staples help to hold the upper permanently in place but cannot penetrate to the inside of the shoe or cause any other trouble. All the tacks 12 and 14 are then withdrawn, which is done conveniently and quickly by a tack puller.

In practice, I prefer next to sandpaper the bottom of the shoe to roughen it and remove any protruding parts and permit the outsole to lie closely in place against the bottom of the insole and the inturned edges of the upper. Thereafter, I apply a suitable adhesive 20 and insert a shank stiffener 21 of stitchable material. I then apply a molded outsole 16 to the bottom of the shoe, subjecting the whole to pressure in a sole-laying machine. The outsole may have a channel on the bottom surface or not, according as the stitching is to be invisible or laid aloft.

The last is then pulled out of the shoe, and the shoe is ready to be stitched.

Figure 5:
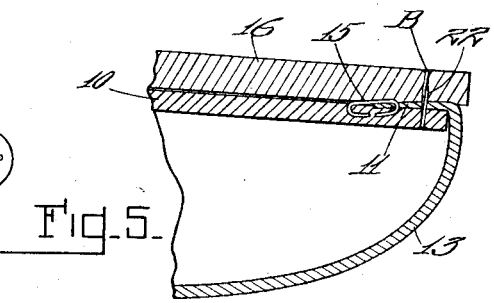
Fig. 5 is a vertical section after the outsole has been applied and stitched.
Figure 4:
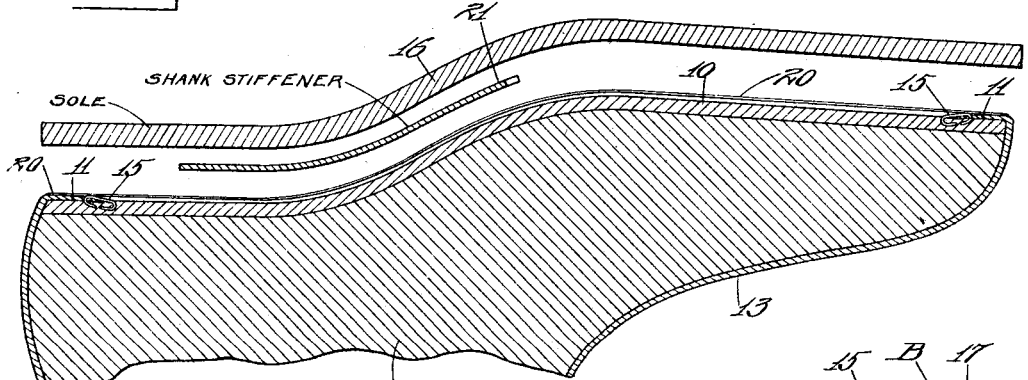
Fig. 4 shows the application of the outsole.
Figure 6:
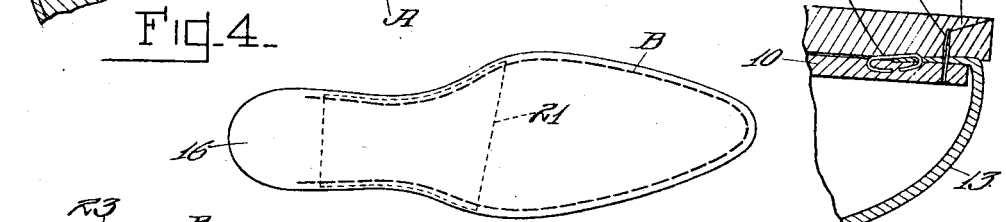
Fig. 6 is a plan view of the bottom of the shoe after it has been stitched.

Next, (Fig. 5) the insole, outsole, and upper are secured together by through-and-through stitching. This is preferably done on a lock-stitch sewing machine of the type shown in my prior Letters Patent No. 1,482,619, February 5, 1924. This machine forms a lock-stitch seam B all the way around the toe on the inside of the shoe close to the edge of the insole, compressing the insole, upper and outsole together heavily, and uniting the whole solidly. The line of stitching preferably starts under the heel, as shown in Fig. 6, and ends in a corresponding position on the other side, and passes through the edges or corners of the shank piece 21, holding it securely in place. The locks of the stitches are deeply set in the outsole, as seen at 22, Fig. 5, and on the inside of the shoe the stitches are pulled down and embedded in the surface of the insole so that the inside of the shoe is left perfectly smooth, and the parts are all drawn tightly together by the threads.

Figure 8:
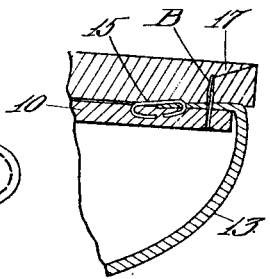
Fig. 8 is a section of a shoe having a channeled outsole and invisible stitching.
Figure 7:
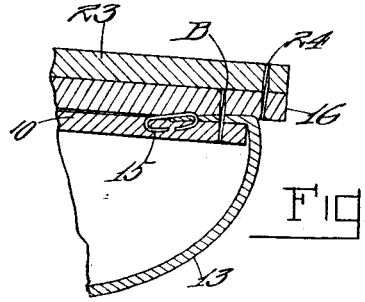
Fig. 7 shows the parts after a double sole has been applied and stitched.

Thereafter, the shoe is finished in the ordinary manner. When a channeled outsole (see Fig. 8) is used and the lip 17 is laid down over the stitching, the shoe when finished, cannot be distinguished from a turn shoe of like materials by any but highly skilled observers.

If a shoe with a heavy extension sole is desired, it is made as already described, but the edge of the sole 16 is cut to a proper size to project the requisite amount beyond the edge of the upper, then an extra sole 23 is applied and stitched, as shown at 24, in the manner employed in the manufacture of welt shoes. No filling is required. The edge is finished in the usual manner. Such a shoe, when complete, is waterproof, since there are no thread holes through which water can reach the interior.

When made from suitable materials, the and the lightness, flexibility and comfort of a turn shoe, but it is better than a turn shoe. When made of heavier leather and with a double sole, it has strength and solidity combined with great flexibility and durability. The interior is perfectly smooth, the seam being set below the surface of the insole and the insole being left in perfectly flat condition to the very edge. There are no tacks to work through and injure the foot, and there is no filling to become displaced with use and form bunches and produce injurious pressure on the tender portions of the foot.

The savings and advantages, besides those inherent in the shoes produced by my novel method, are many. As compared with the welt method, it is altogether simpler and cheaper, may be performed with less machinery and with less expense for skilled help, supervision and inspection. Certain expenses such, for instance, as for the welt, filling and waterproofing, are altogether avoided. The time required for making the shoe is much reduced.

As compared with the turn method, it is also simpler and cheaper. The expensive preparation of the sole is avoided. The entire turning operation, the tempering and long drying are done away with. It is not necessary to pound and beat the shoe into shape after it has been turned and replaced on the last. The lining can be cut to proper size, that is, smaller than the leather or other outside material. The time required is also much less than is required by the turn method.

As compared with the McKay method, there are certain advantages besides those inherent in the shoes produced. The forming of the groove in the channel of the outsole is not necessary; no staples need be used to help hold the outsole to the insole, and therefore there is no injury to the sewing machine possible. Ordinary welt or turn lasts instead of armored lasts can be used. The shoes may be stitched aloft which is impossible with McKay shoes.

Altogether, the method embodying my invention permits the production of high-grade shoes with the speed and cheapness of McKay shoes.

What I claim is:

1. The method of making boots and shoes which includes assembling an upper and an insole on the last, lasting the shoe, permanently securing the upper to the face of the insole next to the outsole, removing the last and sewing a lock stitch seam through the insole, outsole and upper.

2. The method of making boots and shoes which includes assembling an upper and an insole on the last, lasting the shoe, permanently securing the upper to the face of the insole next to the outsole, removing the last and sewing a lock stitch seam through the insole, outsole and upper, applying a double sole and stitching the edge of the outsole to the double sole.

3. The method of making boots and shoes which includes assembling an upper and an intact insole on the last, lasting the shoe, inserting staples to secure the upper to the insole and clinching them within the substance of the insole without causing them to penetrate said insole completely, applying an outsole, removing the last and sewing a seam through the insole, outsole and upper.

4. The method of making a shoe which includes assembling the insole and upper on the last, lasting the shoe and tacking the upper to the insole and last, permanently securing the upper to the face of the insole which is next to the outsole, removing the tacks, applying the outsole, removing the last and attaching the outsole directly to the insole and upper by a line of lock-stitches extending through said parts.

5. The herein described method of making shoes which includes assembling an insole and upper on the last, lasting the shoe, securing the edge of the upper to the insole by inserting staples and clinching them within the substance of the insole, withdrawing the last and sewing an outsole to the insole and upper by a through-and-through lock-stitch seam.

6. The herein described method of making shoes which includes assembling an insole and upper on the last, lasting the shoe and tacking the upper to the insole and last, inserting staples to secure the upper to the insole and clinching them within the substance of the insole, removing the tacks, applying the outsole, removing the last, and sewing the insole, outsole and upper together by a through-and-through lock-stitch seam.

In testimony whereof I affix my signature.
JAMES H. REED.